(12) United States Patent
Baluja et al.

(10) Patent No.: US 12,307,374 B2
(45) Date of Patent: May 20, 2025

(54) DEEP NEURAL NETWORKS WITH NO MULTIPLICATIONS AND NO FLOATING POINT OPERATIONS

(71) Applicant: Google LLC, Mountain View, CA (US)

(72) Inventors: Shumeet Baluja, San Diego, CA (US); David Marwood, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1219 days.

(21) Appl. No.: 17/056,549

(22) PCT Filed: May 20, 2019

(86) PCT No.: PCT/US2019/033057
§ 371 (c)(1),
(2) Date: Nov. 18, 2020

(87) PCT Pub. No.: WO2019/222724
PCT Pub. Date: Nov. 21, 2019

(65) Prior Publication Data
US 2021/0209475 A1 Jul. 8, 2021

Related U.S. Application Data

(60) Provisional application No. 62/673,797, filed on May 18, 2018.

(51) Int. Cl.
*G06N 3/084* (2023.01)
*G06N 3/04* (2023.01)
(52) U.S. Cl.
CPC .............. *G06N 3/084* (2013.01); *G06N 3/04* (2013.01)

(58) Field of Classification Search
None
See application file for complete search history.

(56) References Cited

U.S. PATENT DOCUMENTS 11,182,666 B1 * 11/2021 Phebus .................. G06N 3/048
11,537,870 B1 * 12/2022 Teig ......................... G06N 3/08
(Continued)

OTHER PUBLICATIONS

Agustsson et al., "Soft-to-Hard Vector Quantization for End-to-End Learned Compression of Images and Neural Networks", arXiv:1704.00648v1, Apr. 3, 2017, 15 pages.
(Continued)

*Primary Examiner* — Brian M Smith
(74) *Attorney, Agent, or Firm* — DORITY & MANNING P.A.

(57) ABSTRACT

The present disclosure provides systems and methods that train and use neural networks that can be run with no multiplications and no floating point operations. In particular, according to one aspect of the present disclosure, the respective non-linear and continuous activation functions typically used by the nodes of a neural network can be replaced with custom activation functions that output one of a discrete number of activation values. Likewise, according to another aspect of the present disclosure, the neural network can be trained such that each of its weights equals one of a discrete number of weight values. Taken together, this enables replacement of the typical multiplication process associated with computing a node of the network with a simple, and much faster, lookup process. In particular, a lookup table can store the result of multiplying each unique pair of activation value and weight value.

23 Claims, 7 Drawing Sheets

(56) References Cited

U.S. PATENT DOCUMENTS

| | | | | |
|---|---|---|---|---|
| 2016/0188293 | A1* | 6/2016 | Barat Quesada | H03M 7/24 708/495 |
| 2017/0286830 | A1* | 10/2017 | El-Yaniv | G06N 3/045 |

OTHER PUBLICATIONS

Balle et al., "End-To-End Optimized Image Compression", arXiv:1611.01704v1, Nov. 5, 2016, 24 pages.

Baluja, "Empirical Explorations in Training Networks with Discrete Activations", arXiv:1801.05156v1, Jan. 16, 2018, 27 pages.

Bengio et al., "Estimating or Propagating Gradients Through Stochastic Neurons for Conditional Computation", arXiv:1308.3432v1, Aug. 15, 2013, 12 pages.

Bourzac, "Speck-Size Computers: Now With Deep Learning", IEEE Spectrum, vol. 54, No. 4, 2017, 3 pages.

Cottrell et al., "Principal Components Analysis of Images Via Back Propagation", Proceedings of SPIE 1001, Visual Communications and Image Processing '88, Oct. 25, 1988, 9 pages.

Courbariaux et al., "Binarized Neural Networks: Training Neural Networks with Weights and Activations Constrained to +1 or -1", arXiv:1602.02830v2, Feb. 29, 2016, 11 pages.

Deng et al., "Gated XNOR Networks: Deep Neural Networks with Ternary Weights and Activations under a Unified Discretization Framework", arXiv:1705.09283v1, May 25, 2017, 9 pages.

Denton et al., "Exploiting Linear Structure Within Convolutional Networks for Efficient Evaluation", Twenty-eighth Conference on Neural Information Processing Systems, Dec. 8-13, 2014, Montreal, Canada, 9 pages.

Duda et al., Pattern Classification and Scene Analysis, $2^{nd}$ Edition, Wiley & Sons, Inc., 1995, 69 pages.

Finnerty et al., "Reduce Power and Cost by Converting from Floating Point to Fixed Point", Xilinx, WP491 (v1.0), Mar. 30, 2017, 14 pages.

Glorot et al., "Deep Sparse Rectifier Neural Networks", Fourteenth International Conference on Artificial Intelligence and Statistics, Apr. 11-13, 2011, Ft.Lauderdale, FL, pp. 315-323.

Goodfellow et al., "Maxout Networks", arXiv:1302.4389v3, Feb. 20, 2013, 10 pages.

Han et al., "Deep Compression: Compressing Deep Neural Networks with Pruning, Trained Quantization and Huffman Coding", arXiv:1510.00149v5, Feb. 15, 2016, 14 pages.

Hou et al., "Loss-Aware Binarization of Deep Networks", arXiv:1611.01600v1, Nov. 5, 2016, 11 pages.

Hubara et al., "Quantized Neural Networks: Training Neural Networks with Low Precision Weights and Activations", arXiv:1609.07061v1, Sep. 22, 2016, 29 pages.

Isola et al., "Image-to-Image Translation with Conditional Adversarial Networks", arXiv:1611.07004v1, Nov. 21, 2016, 16 pages.

Jain, "Data clustering: 50 years beyond K-means", Pattern Recognition Letters, vol. 31, No. 8, 2010, 16 pages.

Jiang, "Image compression with neural networks—A survey", Signal Processing: Image Communication, vol. 14, 1999, pp. 737-760.

Kingma et al., "Adam: A Method for Stochastic Optimization", arXiv:1412.6980v4, Mar. 3, 2015, 13 pages.

Kramer, "Nonlinear Principal Component Analysis Using Autoassociative Neural Networks", AIChE Journal, vol. 37, No. 2, Feb. 1991, pp. 233-243.

Krizhevsky et al., "Convolutional Deep Belief Networks on CIFAR-10", Unpublished Manuscript, vol. 40, No. 7, 2010, 9 pages.

Krizhevsky et al., "ImageNet Classification with Deep Convolutional Neural Networks", Twenty-Sixth Conference on Neural Information Processing Systems, Dec. 3-8, 2012, Lake Tahoe, NV, 9 pages.

Lane et al., "An Early Resource Characterization of Deep Learning on Wearables, Smartphones and Internet-of-Things Devices", International Workshop on Internet of Things towards Applications, Nov. 1, 2015, Seoul, South Korea, 6 pages.

Lecun et al., "The MNIST Database of Handwritten Digits", 1998, http://yann.lecun.com/exdb/mnist/, retrieved on May 21, 2021, 7 pages.

Li et al., "Training Quantized Nets: A Deeper Understanding", Thirty-first Conference on Neural Information Processing Systems, Dec. 4-9, 2017, Long Beach, CA, 11 pages.

Lin et al., "Fixed Point Quantization of Deep Convolutional Networks", arXiv:1511.06393v1, Nov. 19, 2015, 12 pages.

Maddison et al., "The Concrete Distribution: A Continuous Relaxation of Discrete Random Variables", arXiv:1611.00712v2, Nov. 6, 2016, 17 pages.

Mentzer et al., "Conditional Probability Models for Deep Image Compression", arXiv:1801.04260v3, Jun. 4, 2018, 19 pages.

Nair et al., "Rectified Linear Units Improve Restricted Boltzmann Machines", International Conference on Machine Learning, Jun. 21-24, 2010, Haifa, Israel, 8 pages.

Plagianakos et al., "Training Multilayer Networks with Discrete Activation Functions", International Joint Conference on Neural Networks, Jul. 15-19, 2001, Washington DC, 6 pages.

Raiko et al., "Techniques for Learning Binary Stochastic Feedforward Neural Networks", arXiv:1406.2989v1, Jun. 11, 2014, 9 pages.

Rastegari et al., "XNOR-Net: ImageNet Classification Using Binary Convolutional Neural Networks", European Conference on Computer Vision, Oct. 8-16, 2016, Amsterdam, The Netherlands, 18 pages.

Rippel et al., "Real-Time Adaptive Image Compression", arXiv:1705.05823v1, May 16, 2017, 16 pages.

Rumelhart et al., "Learning representations by back-propagating errors", Nature, vol. 323, Oct. 9, 1986, 4 pages.

Russakovsky et al., "ImageNet Large Scale Visual Recognition Challenge", arXiv:1409.0575v1, Sep. 1, 2014, 37 pages.

Srivastava et al., "Dropout: A Simple Way to Prevent Neural Networks from Overfitting", Journal of Machine Learning Research, vol. 15, 2014, pp. 1929-1958.

Svoboda et al., "Compression Artifacts Removal Using Convolutional Neural Networks", arXiv:1605.00366v1, May 2, 2016, 10 pages.

Tang et al., "Learning Stochastic Feedforward Neural Networks", Twenty-Seventh Conference on Neural Information Processing Systems, Dec. 5-10, 2013, Lake Tahoe, NV, 9 pages.

Toderici et al., "Full Resolution Image Compression with Recurrent Neural Networks", IEEE Conference on Computer Vision and Pattern Recognition, Jul. 22-25, 2017, Honolulu, Hawaii, pp. 5306-5314.

Toderici et al., "Variable Rate Image Compression with Recurrent Neural Networks", arXiv:1511.06085v5, Mar. 1, 2016, 12 pages.

Vanhoucke et al., "Improving the speed of neural networks on CPUs", Twenty-fifth Conference on Neural Information Processing Systems, Dec. 12-17, 2011, Granada, Spain, 8 pages.

Werbos, "Beyond Regression: New Tools for Prediction and Analysis in the Behavioral Sciences", Harvard University, Thesis, Aug. 1974, 453 pages.

Wu et al., "Training and Inference with Integers in Deep Neural Networks", arXiv:1802.04680v1, Feb. 13, 2018, 14 pages.

Yi et al., "A New Learning Algorithm for Neural Networks with Integer Weights and Quantized Non-linear Activation Functions", IFIP International Federation for Information Processing, vol. 276, 2008, pp. 427-437.

Zhou et al., "DoReFa-Net: Training Low Bitwidth Convolutional Neural Networks with Low Bitwidth Gradients", arXiv:1606.06160v1, Jun. 20, 2016, 13 pages.

Namin et al., "Efficient Hardware Implementation of the Hyperbolic Tangent Sigmoid Function", 4 pages.

International Search Report for PCT/US2019/033057, mailed on Sep. 20, 2019, 2 pages.

Razlighi et al., "LookNN: Neural Network with No Multiplication", 6 pages.

Saichand et al, "FPGA Realization of Activation Function for Artificial Neural Networks." International Conference on Intelligent Systems Design and Applications. pp. 159-164.

* cited by examiner

DEEP NEURAL NETWORKS WITH NO MULTIPLICATIONS AND NO FLOATING POINT OPERATIONS

PRIORITY CLAIM

This application is based upon and claims the right of priority under 35 U.S.C. § 371 to International Application Number PCT/US2019/033057 filed May 20, 2019, which claims priority to and the benefit of U.S. Provisional Patent Application No. 62/673,797, filed May 18, 2018. Applicant claims priority to and the benefit of each of such applications and incorporates all such applications herein by reference in their entirety.

FIELD

The present disclosure relates generally to artificial neural networks ("neural networks"). More particularly, the present disclosure relates to systems and methods that train and use neural networks that can be run with no multiplications and no floating point operations.

BACKGROUND

Artificial neural networks ("neural networks") are a class of machine-learned models that are especially powerful, accurate, or otherwise high-performing for various tasks. An artificial neural network can include a group of connected nodes, which also can be referred to as (artificial) neurons or perceptrons. A neural network can be organized into one or more layers. Nodes of the neural network can be connected with edges and a weight can be associated with each edge.

Neural networks that include multiple layers can be referred to as "deep" networks. A deep network can include an input layer, an output layer, and one or more hidden layers positioned between the input layer and the output layer. The nodes of the neural network can be connected or non-fully connected. Example neural networks include feed-forward neural networks, recurrent neural networks, convolutional neural networks, or other forms of artificial neural networks.

Deep neural networks are being used in countless applications today. However, their accuracy stems in part from having a large number of parameters which incur a high compute and memory overhead. As one example, a typical neural network can include a large number of weights (e.g., ten thousand to ten million that may all have a unique value). Storing a neural network typically requires storing each of these values, which requires a not-insignificant amount of memory usage. As another example, a typical structure of a node of a neural network includes multiplying a value output by a node by one or more weights associated with one or more edges that connect such node to other nodes. These multiplication operations are often performed as floating point operations which are cumbersome and require a significant amount of computing resources (e.g., in the form of a specialized floating-point unit).

It would be beneficial if these networks could be stored and run (and thus their accuracy benefits received) on mobile and other resource-constrained devices such as smart devices or embedded devices. However, due to the significant amount of computing resources such as processing resources and memory resources required to store and run the networks, their use in resource-constrained environments/devices is somewhat limited.

One example of a resource-constrained device is a computing system embedded within a hearing aid. It would greatly improve the performance of the hearing aid if the computing system could include and use various neural networks to filter noise, synthesize portions of speech, and/or otherwise intelligently manipulate received audio to improve the wearer's ability to hear someone speaking. However, due to the size limitations of hearing aids, they typically have only very limited processing, memory, and/or power resources. As such, with existing technology, the use of large, complex networks is simply infeasible.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors and one or more non-transitory computer-readable media that collectively store a neural network that includes a plurality of nodes connected by a plurality of edges. A plurality of weights are respectively associated with the plurality of edges. Each of the plurality of weights equals one of a discrete number of weight values. A respective activation function is associated with each node. The respective activation function associated with each node takes a respective input value and outputs one of a discrete number of activation values. The computer-readable media collectively store a first lookup table that provides, for each unique pair of weight value and activation value, a result value that results from multiplication of such unique pair of weight value and activation value. The computer-readable media collectively store instructions that, when executed by the one or more processors, cause the computing system to perform operations. The operations include running the neural network to obtain a prediction based on input data. Running the neural network includes, for at least a first node of the neural network: accessing the first lookup table to obtain the respective result value associated with the respective pair of activation value and weight value associated with each node connected to the first node from one or more earlier layers; determining a sum of the result values associated with the nodes connected to the first node from the one or more earlier layers; and determining, based at least in part on the sum of the result values, the activation value output by the activation function associated with the first node.

Other aspects of the present disclosure are directed to various systems, apparatuses, ASICs, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
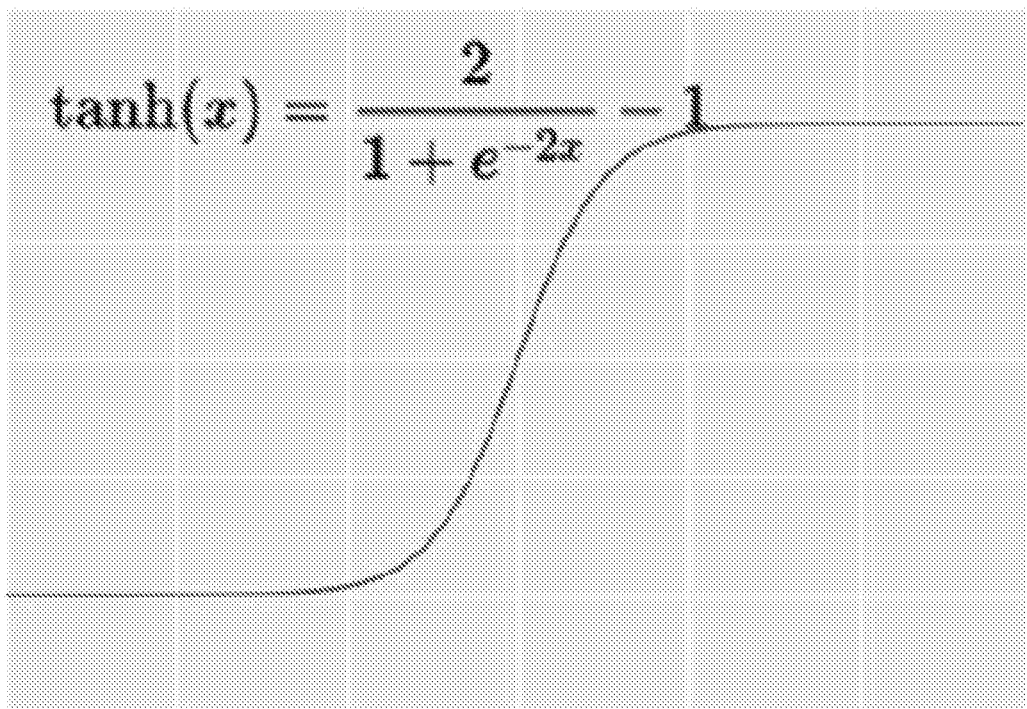
FIG. 1A depicts a hyperbolic-tangent activation function.

Reference numerals that are repeated across plural figures are intended to identify the same features in various implementations.

DETAILED DESCRIPTION

Overview

Example aspects of the present disclosure are directed to systems and methods that train and use neural networks that can be run with no multiplications and no floating point operations. In particular, according to one aspect of the present disclosure, the respective non-linear and continuous activation functions typically used by the nodes of a neural network can be replaced with custom activation functions that output one of a discrete number of activation values. Likewise, according to another aspect of the present disclosure, the neural network can be trained such that each of its weights equals one of a discrete number of weight values. For example, a clustering and re-assignment algorithm can be used (e.g., iteratively) to guide the learning process so that the resultant network weights are limited to the discrete weight values. Thus, a neural network can be structured and trained to internally use only a discrete number of activation values and the discrete number of weight values. Taken together, this enables replacement of the typical multiplication process associated with computing a node of the network with a simple, and much faster, lookup process. In particular, a lookup table can store the result of multiplying each unique pair of activation value and weight value.

Thus, for any given edge in the network, the typical process of multiplying the activation value transmitted along such edge with the weight value associated with such edge can instead be performed by accessing the lookup table and obtaining the corresponding result. This greatly reduces the amount of computing resources required to run the neural network, thereby enabling inference to both occur faster and also be suitable for performance in highly resource-constrained environments. Furthermore, since the weights are limited to a discrete set of weight values, they can be stored in a much more efficient manner than, for example, if each weight needed to be stored separately. For example, each weight can be stored as an integer lookup, rather than storing the actual value itself, thereby conserving memory resources.

According to yet another aspect of the present disclosure, the activation values and the weight values used by the neural network can be fixed point values. For example, each of the values can be an integer. In some implementations, this floating point-free scheme can be achieved by first training the network permitting weight and/or activation values to be represented as floating point values. Next, after training, the activation values and/or the weight values can be converted into fixed point representation. In some implementations, this elimination of floating point values can be performed by multiplying each activation value by a first conversion value such that, after multiplication, a desired number of most significant digits of the smallest value of the set of activation values are no longer fractional. This same process can additionally or alternatively be performed for the weight values using a second conversion value. Having each of the activation and weights values be a fixed point value (e.g., integer) can eliminate the requirement of performing floating point operations when running the network, thereby enabling inference to both occur faster and also be suitable for performance in highly resource-constrained environments.

Thus, the systems and methods of the present disclosure are directed to a specific technical implementation which enables instantiation of trained neural networks without using any multiplications and avoiding any floating point representation. This allows the deployment of neural networks on much cheaper/low-powered/limited hardware (e.g. devices having very limited computational power) and on very simple designs of specialized chips (e.g., application-specific integrated circuits (ASICS) or field programmable gate arrays (FPGAs)). These technical considerations motivated the design of the methods described herein.

The neural network may be trained for regression-type or classification-type applications. Methods described herein are particularly suitable for processing visual (e.g. image) or speech data, for example image recognition, image compression or other visual (e.g. image) data processing or speech recognition or other speech data processing.

Moreover aspects of the present disclosure are enabled by applying various techniques during training the neural network. In particular, the present disclosure provides two significant modifications to standard training algorithms.

First, aspects of the present disclosure are directed to modifying the activation function of nodes of the neural network. In particular, neural networks typically have one or more non-linear activation functions for their internal nodes. Example activation functions include the sigmoid function, the hyperbolic-tangent (tanh), rectified linear units ("ReLU"), ReLU6, and the like.

Most commonly, the activation function takes real-valued inputs, sums them, passes them through a non-linear activation function such as, for example, hyperbolic-tangent (tanh) and then outputs a real value.

According to an aspect of the present disclosure, rather than one of these typical activation functions, a custom activation function that discretizes the outputs can be used instead. That is, each node can output one of a discrete number of activation values (e.g., less than or equal to 2, 4, 16, 32, 256, etc.).

Figure 1B:
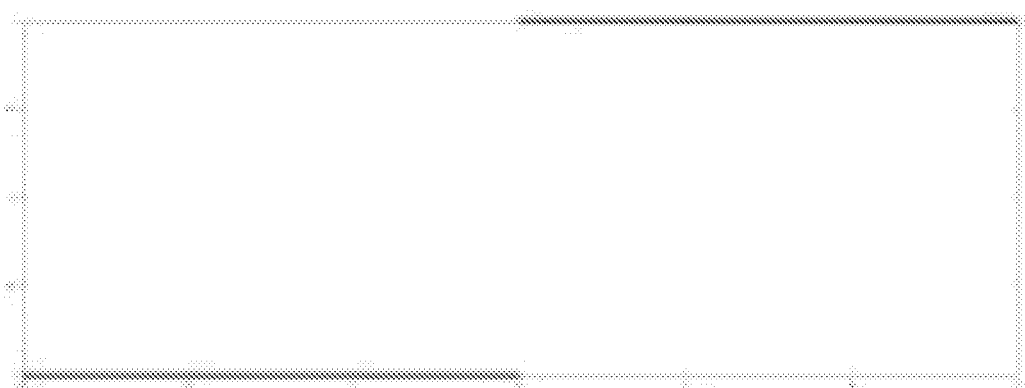
FIGS. 1B-E depict discretized versions of the hyperbolic-tangent activation function of FIG. 1A according to example embodiments of the present disclosure.
Figure 1C:
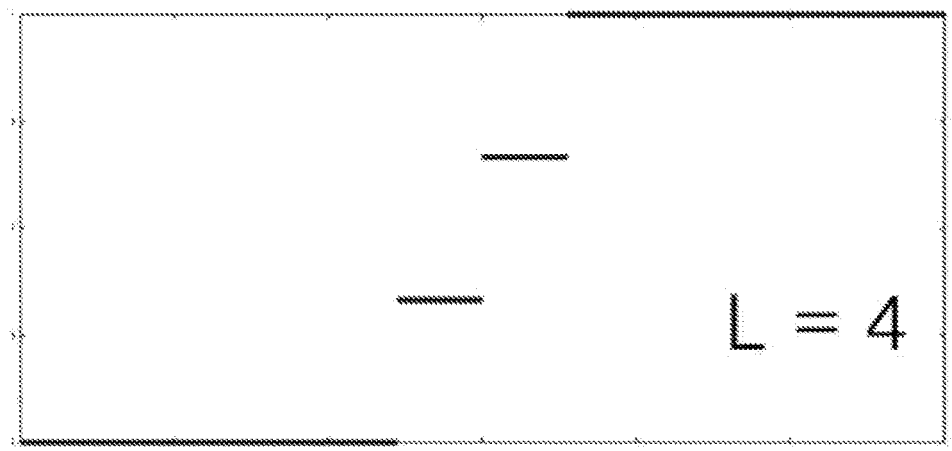
Figure 1D:
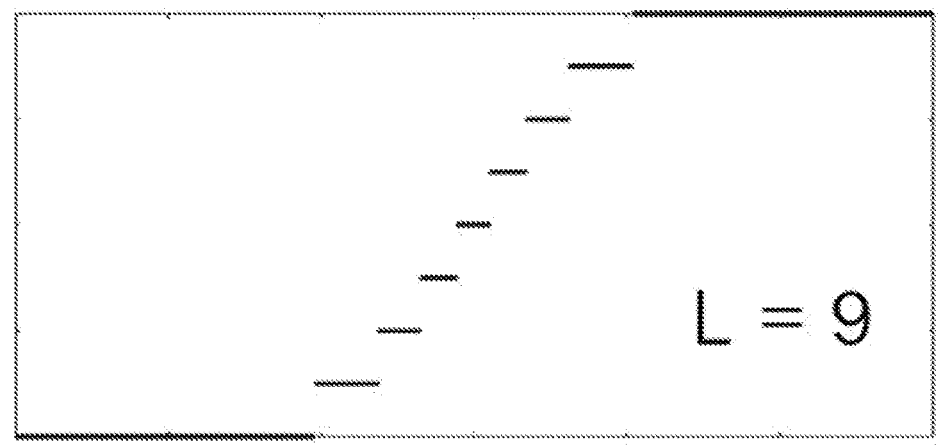
Figure 1E:
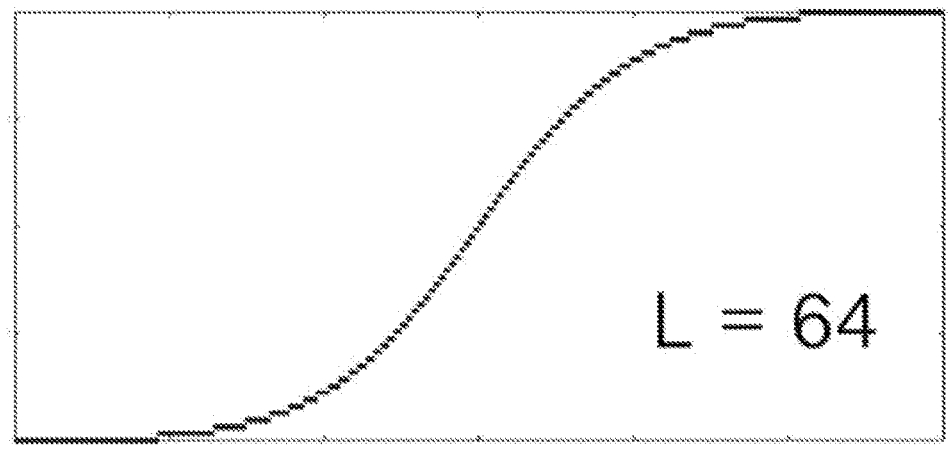

As one example, FIG. 1A shows an example of a continuous tanh activation function. FIG. 1B shows the tanh activation function discretized to output one of two discrete activation values. FIG. 1C shows the tanh activation function discretized to output one of four discrete activation values. FIG. 1D shows the tanh activation function discretized to output one of nine discrete activation values. FIG. 1E shows the tanh activation function discretized to output one of sixty-four discrete activation values.

Although the tanh function and discretized variants of the tanh function are shown in FIGS. 1A-E, any activation function can be modified in a similar fashion as is shown in the examples of FIGS. 1A-E. For example, a sigmoid, ReLU function (e.g., ReLU-6), rectified-tanh, or other activation functions can be modified in a similar fashion so that it outputs a discrete number of activation values. The number of activation values can be manually chosen or can be determined according to a heuristic or can be learned. The actual activation values can be manually chosen or can be determined according to a heuristic or can be learned. For activation functions that do not have an upper bound (e.g., a basic ReLU function), the discretized variant can have an upper bound imposed. The upper bound can be manually chose or can be determined according to a heuristic or can be learned.

In some implementations, to create a neural network that uses discretized tanh functions instead of the typical tanh functions, training can be modified to a use a Sigmoid-Underlying, Discrete-Output Units (SUDO units). In some implementations, the SUDO unit can be instantiated with a pre-defined set of output discretization levels or activation values L that lie between a bounded range (e.g., either 0 and 1 or −1 and +1).

In some implementations, during the forward pass of the network (e.g., the inference phase), the units can implement the following example code:

function SUDO_Activation (input, levels):
    underlying←tanh(input)
    activation_step←2/(levels-1)
    plateauRange←2/levels
    output←(⌈underlying+1.0))/plateauRange⌉−1.0*activation_step
    return (−1.0+output)

The above is provided as an example only. Other implementations of the custom activation functions described herein can be used as well. For example, discretization of the ReLU activation function may have different implementations, but generally follow the same principle to transform the function to output a discrete set of activation values L. As another example, a rectified version of tanh can be discretized as well.

However, the discretized activation functions are not well suited for calculating derivatives since they are, in some implementations, both discontinuous and largely characterized only by piece-wise constant functions. In contrast, standard activation functions such as sigmoid and tanh activations do not suffer from this problem.

Thus, in order to use gradient-based methods (e.g., backpropagation) with the discretized activation function, the gradient of the underlying activation function can be used rather than attempting to use the gradient of the discretized activation function (e.g., during backpropagation). Thus, while the discretized version is used during forward passes, the underlying original version of the activation function can be used to determine the gradient during backwards passes.

This enables networks to train quickly and yields discrete activation functions within the neural network. This is a first step to achieving no multiplications. A second step including modifying the weights of the network to have discretized weights.

More particularly, normally, after training, a network has a large number of weights (e.g., ten thousand to ten million) that all have a unique value. They are real-values often created with no constraints.

According to an aspect of the present disclosure, all of the network's weights can be enforced to take on only a small number of unique weight values (U). As examples, the number of weight values U can equal 100 values, 1000 values, etc.

In some implementations, this can be accomplished by pre-defining the set of unique weight values U. Then during training, the weights can be updated using gradient-based techniques, but must equal one of the pre-defined values.

In other implementations, a clustering technique can be used to determine the weight values. In particular, in one example, a computing system can initialize the network with random weights. The network can be trained for E epochs, where an epoch is a pass through in the training set. As examples, the number of epochs E can be between 1 and 100 depending on the size of the training set. During training, the discretized activation functions can be used for forward passes while the original underlying function used for backward passes, as described above.

After the E epochs, the computing system can extract at least some of the weights from the network and can perform a clustering of the extracted weights to find U clusters. The extracted weights can be a subset of the weights or can be the entirety of the weights. Any clustering method can be used. Example clustering techniques include k-means clustering, Learning-Vector Quantization, hierarchical clustering, etc.

The computing system can identify a representative weight value for each of the U clusters. The representative weight value can be a centroid such as a mean value or median value of all of the values assigned to that cluster.

The computing system can map all of the weights assigned to each cluster to the representative weight value of that cluster. That is, each weight can be updated to equal the representative value of its cluster. The network can be updated so that the updated weight values are included in the network.

Thus, after the clustering and update, all of the weights will be equal to one of the discrete number of weight values. The network can be used for inference at this point or can undergo further rounds of training and subsequent clustering and weight updating.

This technique ensures that the weights of the network have only U distinct values. Note that the "bias" units in the network can also optionally be included in this procedure.

Training with these two modifications produces a network that outputs only a small set of discrete values at each node (L) and in which the network has a small number of weights (U).

According to another aspect of the present disclosure, floating point values can also be eliminated from the network. In particular, in some implementations, each L and U value can be converted to a fixed point representation (e.g., an integer). This can be done by taking the smallest value of L and multiplying it by a conversion value, M, where the N most significant digits are no longer fractional. The number N can be manually set by looking at the distribution of the values to be disambiguated and the margin of error. The same process can be repeated for the weight values.

To use the networks according to the present disclosure in practice, recall that that in a standard network, the inputs to a node are the outputs of the nodes of the previous layer multiplied by the weight of the connection to that node.

Thus, the input of node i in layer b is:
Sum=0
    For all nodes, g, connected to i from layer a:
    Sum+=(output of node g*weight_i_g)

Normally, this involves a multiplication, as indicated in the parenthesis above. However, due to the discretized structure of the activation values and weight values, it is no longer necessary to compute: output of unit g*weight_i_g.

Instead, recall that the output of unit g is one of L values, while the weight_i_g is one of U values. Thus, before deployment, a lookup table can be created of all L*U values. In such fashion, no multiplication needs to be done and can instead be replaced with a table lookup. The addition operation, however, can still be performed as normal.

The next step in computing the output of node i is to typically to pass the Sum through a non-linear activation function (e.g., tanh). However, since the number of unique outputs (L) is specified and the range of input values for which each output will be triggered is known, the output of the activation function does not need to be computed either. Instead, a second lookup table based on L+1 ranges that specifies the output can be used. The output can be an integer (or fixed point floating). Note that a scaling factor can be used here since the network was trained prior to the elimination of floating point values. However, that scaling factor is simply the conversion values that were used in the previous step.

Now, the output of each node can be computed with no multiplications and outputting only one-of-L values. This allows the next layer to be computed in the same way and so on—all the way through the network.

In some implementations, the inputs to the network may still be floating point values, as the original data to be classified may not be changed. Conversely, the output may need to be converted to a floating point if the consuming application requires it. Thus, in some implementations, the computing system may convert input data from a floating point representation to a fixed-point representation or convert a prediction of the neural network from a fixed-point representation to a floating point representation according to a conversion value. However, all internal computations can be optimized without floating point and with no multiplications.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can further include one or more lookup tables 121. For example, the lookup tables can include a results lookup table that provides results values for pairs of activation values and weight values associated with the machine-learned models and/or an activation lookup table that provides activation values for ranges of input values. Additionally or alternatively, the server computing system 130 can include one or more lookup tables 141 which may include results lookup tables and/or activation lookup tables associated with the models 140.

The user computing device 102 can also include a floating point converter 123. The floating point converter 123 can use conversion values to convert values between floating point representations and fixed point representations such as integer representations. In some implementations, the floating point converter 123 can search for the smallest conversion values which provide results which satisfy certain constraints (e.g., that convert a smallest value to have a sufficient number of non-fractional most significant digits. Additionally or alternatively, the server computing system 130 can include a floating point converter 142 which may operate the same as described with respect to converter 123. In some implementations, the training computing system 150 can additionally or alternatively include a floating point converter.

The floating point converter (e.g., any converter shown or described herein) includes computer logic utilized to provide desired functionality. The floating point converter can be implemented in hardware, firmware, and/or software controlling a general purpose processor. For example, in some implementations, the floating point converter includes program files stored on a storage device, loaded into a memory and executed by one or more processors. In other implementations, the floating point converter includes one or more sets of computer-executable instructions that are stored in a tangible computer-readable storage medium such as RAM hard disk or optical or magnetic media.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, the model trainer 160 can discretize weights of the models while training the models. For example, the model trainer 160 can perform a clustering technique described herein to discretize the weights.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 3:
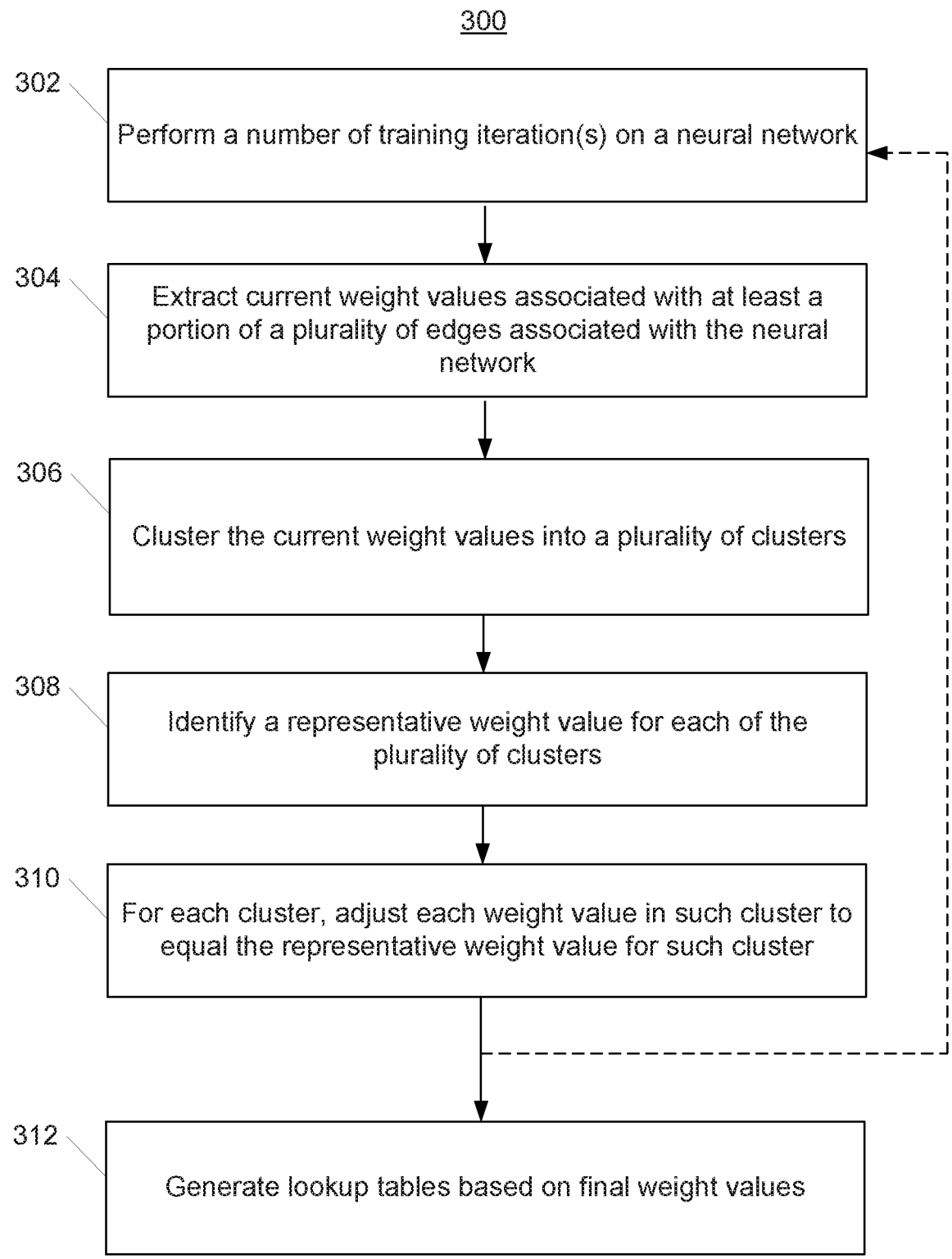
FIG. 3 depicts a flow chart diagram of an example method to train a neural network according to example embodiments of the present disclosure.

FIG. 3 depicts a flow chart diagram of an example method 300 to train a neural network according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system performs a number of training iterations on a neural network. The number of training iterations can be one or it can be greater than one. Training can include using a discretized activation function during forward passes while using an underlying activation function during backwards passes.

At 304, the computing system extracts current weight values associated with at least a portion of a plurality of edges associated with neural network. The portion of edges can be a subset of all edges or can include an entirety (i.e., all) of the edges.

At 306, the computing system can cluster the current weight values into a plurality of clusters. At 308, the computing system can identify a representative weight value for each of the plurality of clusters. For example, the mean or median of all weights assigned to a cluster can be used as the representative value.

At 310, the computing system can adjust each weight value in a cluster to equal the representative weight value for such cluster. This can include updating the weight values within the neural network. If a weight value already equals the representative weight value, "adjusting" such value can simply include leaving it equal to the same value.

After 310, method 300 can optionally return to 302 and begin the method again. Thus, a number of iterations of the process can be performed to iteratively train the model while discretizing the weights.

After one or more iterations of steps 302-310, the method 300 can proceed to 312 and generate lookup table(s) based on the final weight values.

Figure 2A:
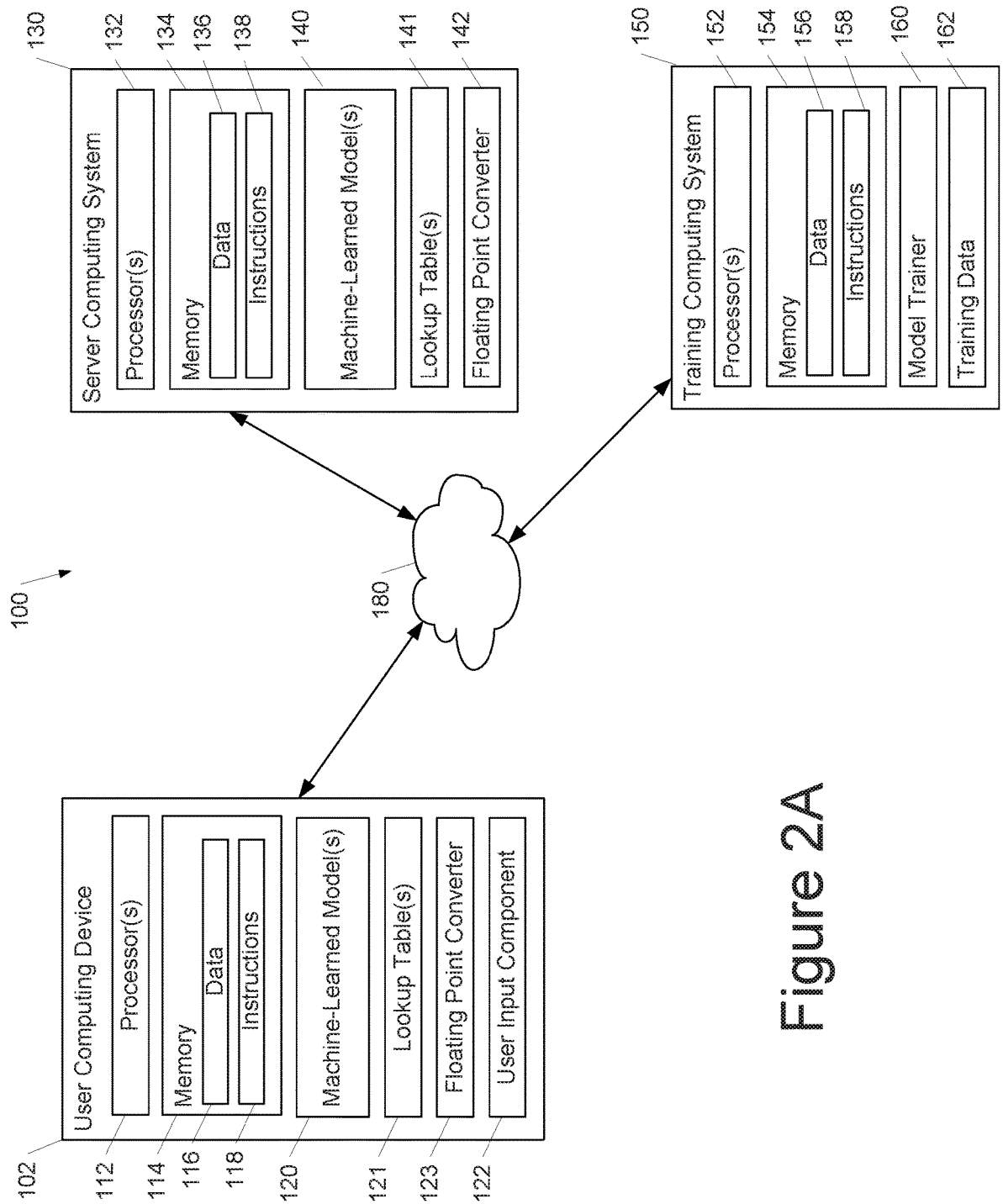
FIG. 2A depicts a block diagram of an example computing system according to example embodiments of the present disclosure.
Figure 2B:
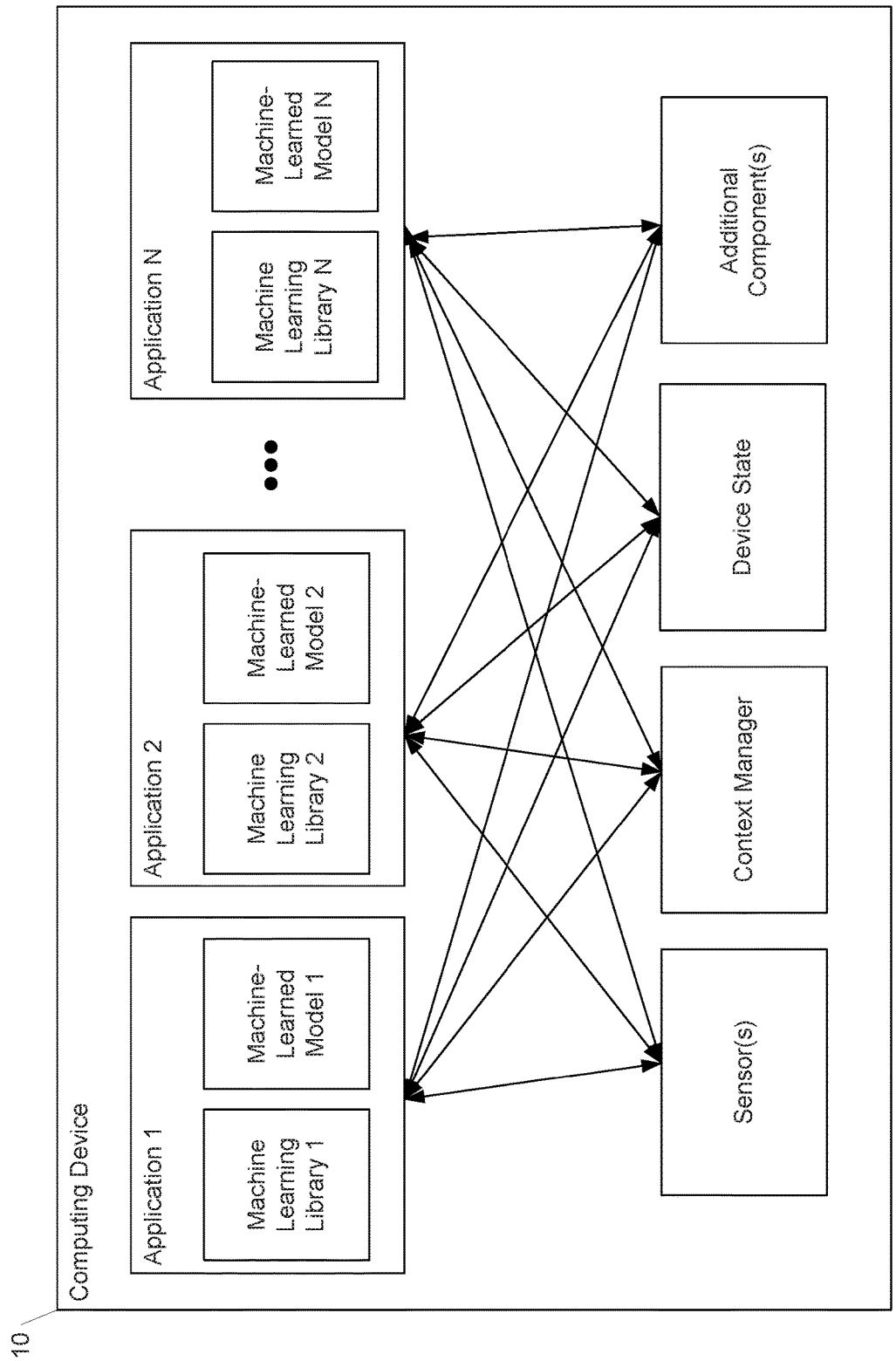
FIG. 2B depicts a block diagram of an example computing device according to example embodiments of the present disclosure.
Figure 2C:
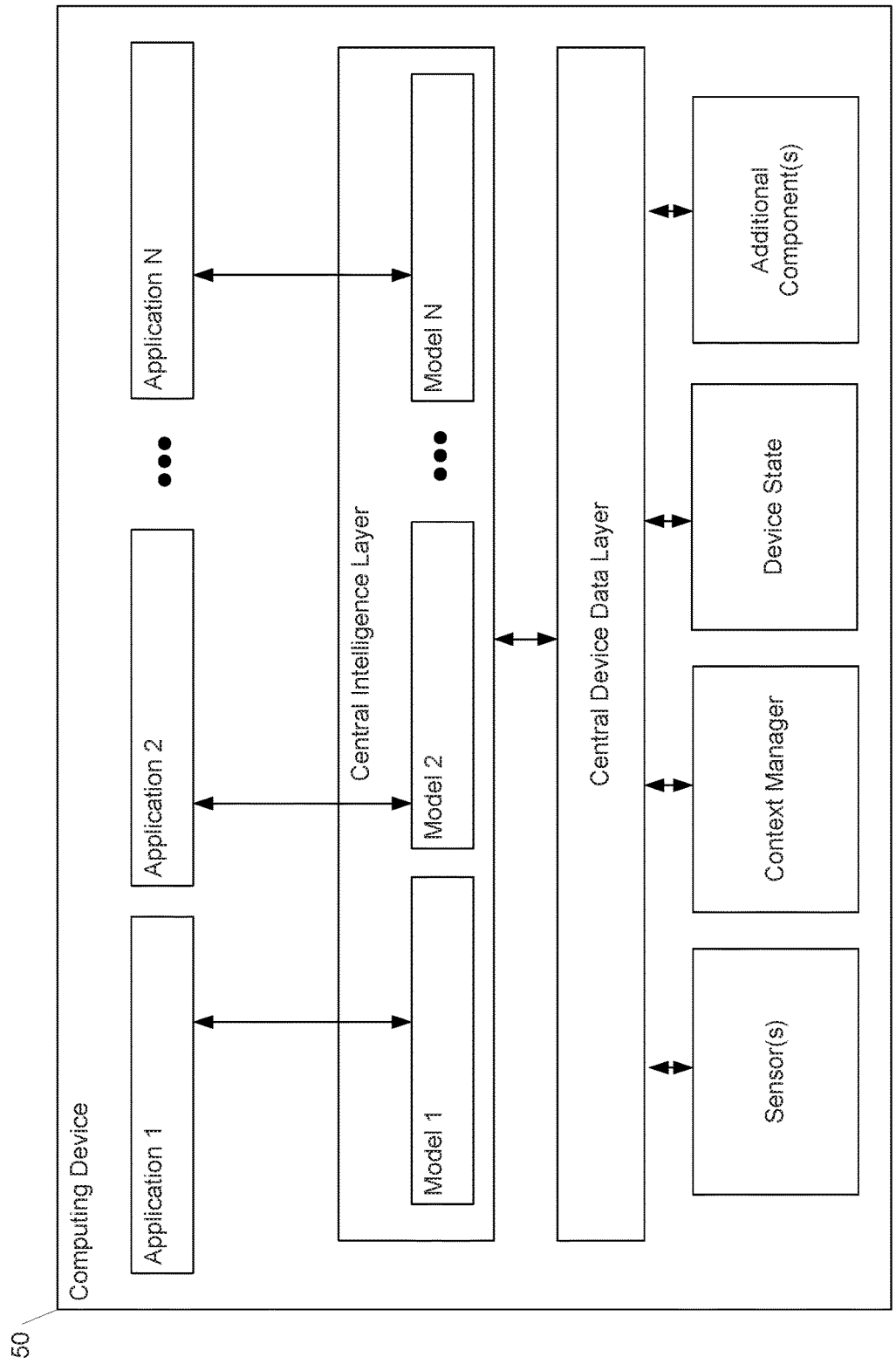
FIG. 2C depicts a block diagram of an example computing device according to example embodiments of the present disclosure.

In one example, method 300 can be performed by the model trainer of the training computing system illustrated in FIG. 2A.

Figure 4:
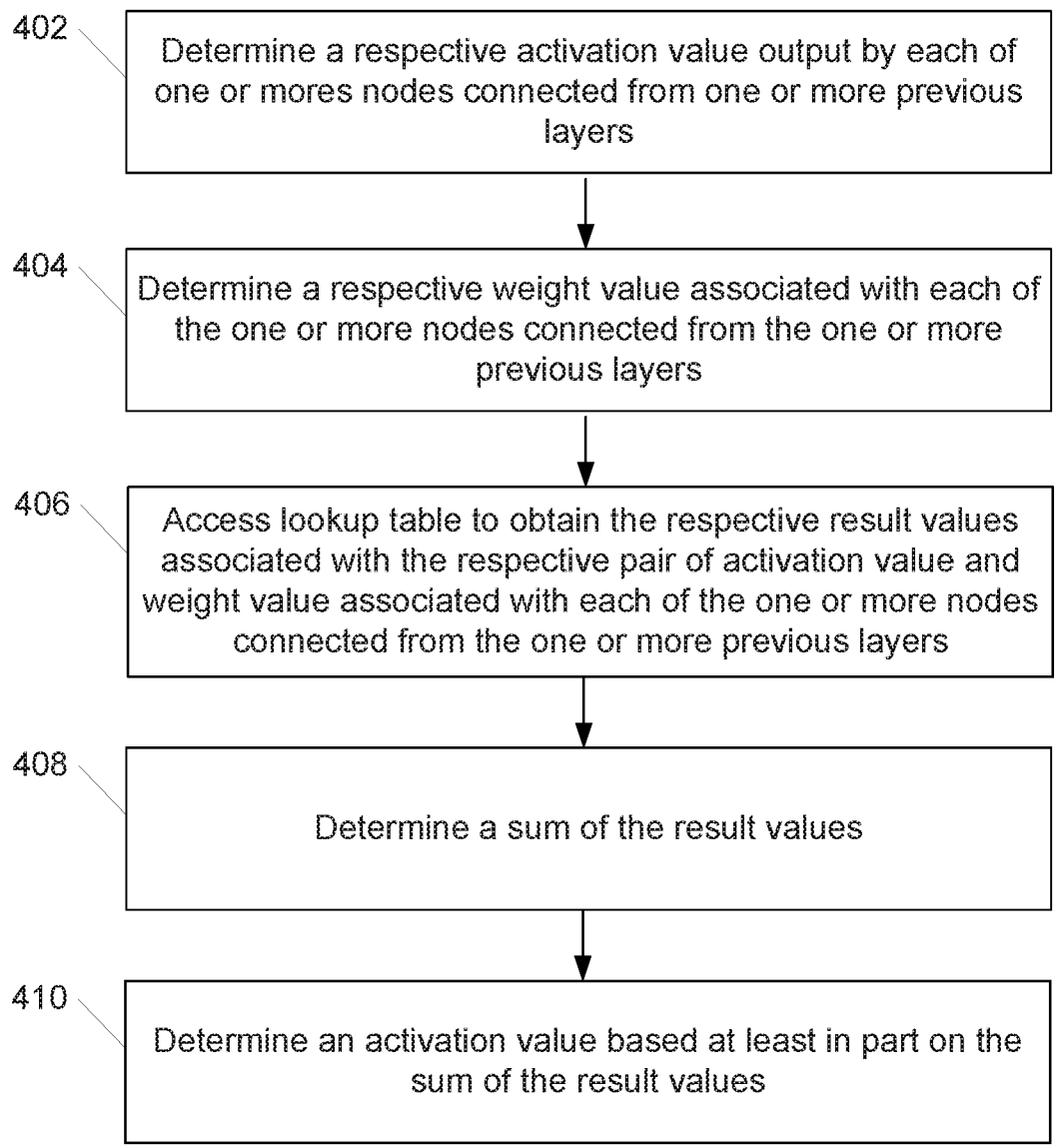
FIG. 4 depicts a flow chart diagram of an example method to run a neural network according to example embodiments of the present disclosure.

FIG. 4 depicts a flow chart diagram of an example method to perform run a neural network according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

Method 400 can be performed for each of one or more nodes of a neural network. The one or more nodes can include all of the nodes of the network or only a subset of the nodes of the network.

At 402, a computing system determines a respective activation value output by each of one or more nodes connected from one or more previous or earlier layers.

At 404, the computing system determines a respective weight value associated with each of the one or more nodes connected from the one or more previous layers.

At 406, the computing system access a lookup table to obtain the respective result values associated with the respective pair of activation value and weight value associated with each of the one or more nodes connected from the one or more previous layers.

At 408, the computing system determines a sum of the result values identified at 406.

At 410, the computing system determines an activation value based at least in part on the sum of the result values. In some implementations, determining the activation value at 410 can include accessing a second lookup table to obtain the activation value associated with the sum of the result values or associated with the sum of the result values plus a bias value.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors;
one or more non-transitory computer-readable media that collectively store:
a neural network comprising a plurality of nodes connected by a plurality of edges, wherein a plurality of weights are respectively associated with the plurality of edges, wherein each of the plurality of weights equals one of a discrete number of weight values, wherein a respective activation function is associated with each node, and wherein the respective activation function associated with each node takes a respective input value and outputs one of a discrete number of activation values;
a first lookup table that provides, for each unique pair of weight value and activation value, a result value that results from multiplication of such unique pair of weight value and activation value; and
instructions that, when executed by the one or more processors, cause the computing system to perform operations, the operations comprising:
training the neural network, wherein training the neural network comprises:
running the neural network to process a training example and provide a training output, wherein running the neural network comprises implementing the respective activation function associated with each node to receive one of the discrete number of activation values;
determining a training loss based at least in part on the training output; and
backpropagating the training loss through the nodes of the neural network, wherein backpropagating the training loss through the nodes comprises determining a respective gradient of a respective underlying activation function that is approximated by the respective activation function of each node; and
subsequently running the neural network at a first time to obtain a prediction based on input data, wherein running the neural network at the first time comprises, for at least a first node of the neural network:
accessing the first lookup table to obtain the respective result value associated with the respective pair of activation value and weight value associated with each node connected to the first node from one or more earlier layers;
determining a sum of the result values associated with the nodes connected to the first node from the one or more earlier layers; and
determining, based at least in part on the sum of the result values, the activation value output by the activation function associated with the first node.

2. The computing system of claim 1, wherein:
the one or more non-transitory computer-readable media further store a second lookup table that provides a correspondence table between input values and the activation values for the respective activation function associated with at least the first node; and
determining, based on the sum of the result values, the activation value output by the activation function associated with the first node comprises accessing the second lookup table to obtain the activation value associated with the sum of the result values or associated with the sum of the result values plus a bias value.

3. The computing system of claim 1, wherein all of the weight values and all of the activation values comprise fixed-point values.

4. The computing system of claim 1, wherein all of the weight values and all of the activation values comprise integers.

5. The computing system of claim 1, wherein the respective activation function associated with each node comprises a non-continuous piece-wise constant function.

6. The computing system of claim 1, wherein the number of activation values is four or more.

7. The computing system of claim 1, wherein at least two of the nodes have respective activation functions that approximate different underlying activation functions.

8. The computing system of claim 1, wherein the operations further comprise:
identifying a first conversion value that, when multiplied with a smallest weight value of the discrete number of weight values, results in a modified weight value that has a number of most significant digits that are non-fractional; and
using the first conversion value to convert each of the weight values to a fixed point representation.

9. The computing system of claim 1, wherein the operations further comprise one or both of: converting the input data from a floating point representation to a fixed-point representation; or converting the prediction of the neural network from a fixed-point representation to a floating point representation according to a conversion value.

10. The computing system of claim 1, wherein the operations further comprise training the neural network prior to running the neural network, wherein training the neural network comprises, at one or more iterations:
determining a plurality of current weight values respectively associated with at least a portion of the plurality of edges;
clustering the plurality of current weight values into a plurality of clusters;
identifying a representative weight value for each of the plurality of clusters; and
for each cluster, adjusting each weight value in such cluster to equal the representative weight value for such cluster.

11. The computing system of claim 10, wherein, at a final iteration, training the neural network further comprises generating the first lookup table based on the representative weight values identified for the plurality of clusters.

12. The computing system of claim 1, wherein the one or more processors comprise at least one of an application specific integrated circuit or field-programmable gate array.

13. The computing system claim 1, wherein the operations further comprise:
    re-training the neural network based on a set of additional training data, wherein re-training the neural network comprises identifying a new set of discrete weight values; and
    after re-training the neural network, updating the first lookup table based on the new set of discrete weight values.

14. The computing system of claim 1, wherein the neural network comprises a regression network and the prediction comprises a regression prediction.

15. A computer-implemented method, the method comprising:
    obtaining, by one or more computing devices, data descriptive of a neural network comprising a plurality of nodes connected by a plurality of edges, wherein each node implements a respective discretized activation function that outputs one of a discrete number of activation values, and wherein each edge has one of a discrete number of weight values and wherein the neural network was trained by:
        running the neural network to process a training example and provide a training output, wherein running the neural network comprises implementing the respective discretized activation function implemented by each node to receive one of the discrete number of activation values;
        determining a training loss based at least in part on the training output; and
        backpropagating the training loss through the nodes of the neural network, wherein backpropagating the training loss through the nodes comprises determining a respective gradient of a respective underlying activation function that is approximated by the respective discretized activation function of each node; and
    running, by the one or more computing devices, the neural network to process input data and produce an inference, wherein running the neural network comprises accessing, by the one or more computing devices, a lookup table to obtain, for each edge of the network, a pre-calculated multiplication result associated with the weight value of such edge and the activation value output by an upstream node connected to such edge.

16. A computer-implemented method for deploying a neural network model in a resource-constrained environment, the method comprising receiving input data at the neural network model and processing said input data through a plurality of layers of the neural network model to generate output data, said processing comprising:
    generating a plurality of activation values for respective nodes in a layer of the neural network model, each activation value corresponding to an output of a respective discretized activation function that outputs one of a discrete number of activation values;
    accessing one or more lookup tables to obtain a plurality of result values, each result value being obtained based on a respective pair comprising an activation value and a weight value, the weight value corresponding to one of a plurality of predetermined weight values, wherein each result value corresponds to multiplication of the activation value and the weight value of its respective pair;
    determining a sum of said plurality of result values; and
    generating an activation value for a node of the next layer of the neural network model based at least in part on the sum;
    wherein the neural network was trained by:
        running the neural network to process a training example and provide a training output, wherein running the neural network comprises implementing the respective discretized activation function implemented by each respective node to receive one of the discrete number of activation values;
        determining a training loss based at least in part on the training output; and
        backpropagating the training loss through the nodes of the neural network, wherein backpropagating the training loss through the nodes comprises determining a respective gradient of a respective underlying activation function that is approximated by the respective discretized activation function of each node.

17. The computer-implemented method of claim 16, wherein generating the activation value for the node of the next layer of the neural network model comprises accessing an activation lookup table which identifies respective activation values for each of a plurality of ranges of input values, each respective activation value corresponding to an output of said discretized activation function.

18. The computer-implemented method of claim 16, wherein the number of predetermined weight values is less than or equal to 1000.

19. The computer-implemented method of claim 16, wherein said activation and weight values are integers or fixed point values.

20. The computer-implemented method of claim 16, wherein:
    the input data comprise visual data and the processing comprises image recognition, image compression, or other visual data processing, and/or
    the input data comprise speech data and the processing comprises speech recognition or other speech processing.

21. Apparatus comprising hardware configured to carry out the method of claim 16.

22. An application specific integrated circuit or field-programmable gate array configured to carry out the method of claim 16.

23. A computer-implemented method of training a neural network model for use in a resource-constrained environment, comprising:
    receiving input data at the neural network model, wherein the input data is based on one or more training examples;
    processing said input data in a forward pass through a plurality of layers of the neural network model to provide a training output, wherein said processing comprises generating a plurality of activation values for respective nodes of the neural network model, each said activation value corresponding to the output of a discretized activation function, said discretized activation function being associated with a corresponding underlying activation function,
    adjusting the values of one or more weight values of the neural network model based on backpropagation or other gradient-based method, using one or more derivatives of said underlying activation function; and
    discretizing a plurality of weight values of the neural network model, wherein said discretizing comprises:

clustering a plurality of weight values of the neural network model into a plurality of clusters;
identifying a representative weight value for each of the plurality of clusters; and
for each cluster, adjusting each weight value in such cluster to equal the representative weight value for such cluster.

* * * * *